A. R. WILLIAMS.
AUTOMOBILE SIGNAL.
APPLICATION FILED APR. 16, 1917.
1,273,709.
Patented July 23, 1918.
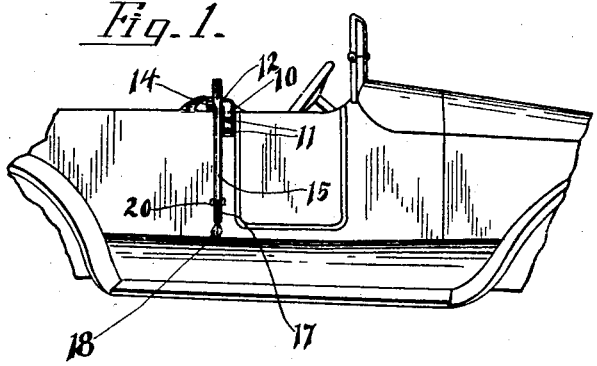
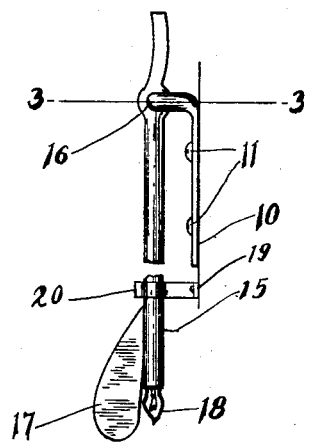
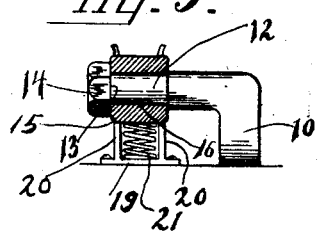
WITNESSES:
R. Wakefield
H. M. Test
Inventor
A.R. WILLIAMS
By
Attorneys

UNITED STATES PATENT OFFICE.

ARTHUR ROY WILLIAMS, OF WASHINGTON, DISTRICT OF COLUMBIA.

AUTOMOBILE-SIGNAL.

1,273,709.  Specification of Letters Patent.  Patented July 23, 1918.

Application filed April 16, 1917. Serial No. 162,433.

*To all whom it may concern:*

Be it known that I, ARTHUR ROY WILLIAMS, a citizen of the United States, residing at Washington, in the District of Columbia, have invented certain new and useful Improvements in Automobile-Signals; and I do hereby declare the following to be a full, clear, and exact description of the invention, such as will enable others skilled in the art to which it appertains to make and use the same.

This invention relates to improvements in signaling devices and particularly to signaling devices used on automobiles to indicate to other vehicles that a change of direction is to be made.

One object of the present invention is to provide a simple device of this character which can be quickly and conveniently operated by the driver of the car without taking his hands from the controlling wheel and levers.

Another object is to provide a device of this character which can be quickly and easily applied to the automobiles now in use, and which will be effective to signal to other vehicles the intention to change the direction of travel.

Other objects and advantages will be apparent from the following description when taken in connection with the accompanying drawing.

In the drawing:

Figure 1 is an elevation of the device shown applied to a portion of an automobile, the arm being in lowered position.

Fig. 2 is a side elevation of the device.

Fig. 3 is a sectional view taken on the line 3—3 of Fig. 1.

Referring particularly to the accompanying drawing 10 represents a plate which is secured to the side of the automobile, adjacent the driver, by means of the screws 11. The upper end of the plate 10 is extended at right angles to the body thereof, and reduced, as at 12. The extremity of this reduced portion is threaded, as shown at 13, to receive thereon the nut 14. An elongated bar or arm 15 is provided with a transverse opening 16 in its upper end, and through this opening is disposed the threaded portion of the member 13. Thus the arm is pivotally mounted on the plate for swinging movement into a vertical position at times, and into a horizontal position, at times, the latter position being extended outwardly from the side of the automobile so that it can be seen from the front by an approaching vehicle, or by one following from the rear. Thus the intention to change direction is very readily communicated to other vehicles, so that collisions may be avoided.

It will be noted that the upper portion of the arm extends to a short distance above the pivot thereof. This extending portion is arranged to be engaged by the arm of the driver, or to be depressed by his hand, whereby the arm will be swung into a horizontal position from the side of the automobile, and be in plain sight of the drivers of other automobiles approaching from the front or rear.

Secured to the side of the automobile, below the plate 10, is a second plate 19 which carries a pair of outwardly extending parallel arms 20, for the reception therebetween of the outer or free end portion of the arm 15. Secured to this plate 19, between the arms 20, and extending outwardly in parallel relation with said arms, is a coil spring 21, which serves to receive the outer end of the arm 15 thereagainst, when said arm is released and permitted to fall into a vertical position. This spring will prevent injury to the lamp on the end of the arm, and also prevent injury to the arm and to the side of the automobile. Furthermore, there will be no appreciable sound incident to the dropping of the arm, when said arm is released.

On the outer end of the arm 15 there is secured a blade 17 which is to be colored red to attract the attention of the other drivers in the vicinity of the automobile. An electric lamp 18 is also mounted on the outer end of the arm 15, and is suitably connected in the lighting circuit of the automobile in any convenient or desired manner, but such that the lamp may be quickly and easily lighted at night, and extinguished in the daytime.

What is claimed is:

A signal device for an automobile including a plate having a stem extending outwardly from the upper end and transversely thereof, a vertically disposed arm having a transverse opening formed at a suitable distance from one end thereof and receiving the transverse portion of said stem therein, a nut engaged on the stem outwardly of the arm, means for holding the arm from accidental swinging movement, and an extension on the arm above the pivoted portion for engagement by the arm of the driver of the automobile to swing the arm into horizontal signaling position.

In testimony whereof, I affix my signature in the presence of two witnesses.

ARTHUR ROY WILLIAMS.

Witnesses:
 EDITH M. TINCKER,
 STELLA J. WILLIAMS.

Copies of this patent may be obtained for five cents each, by addressing the "Commissioner of Patents, Washington, D. C."